Patented May 26, 1953

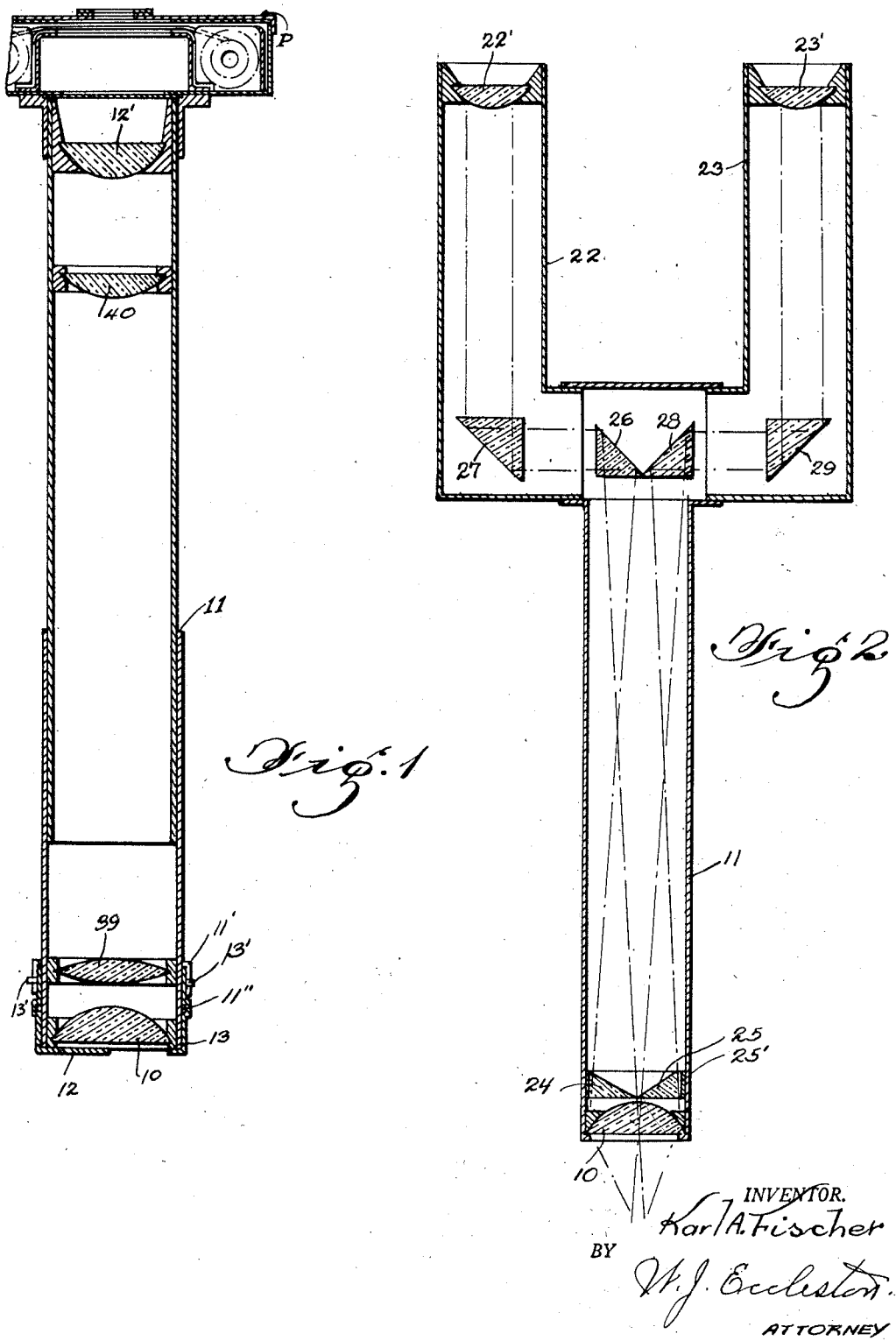

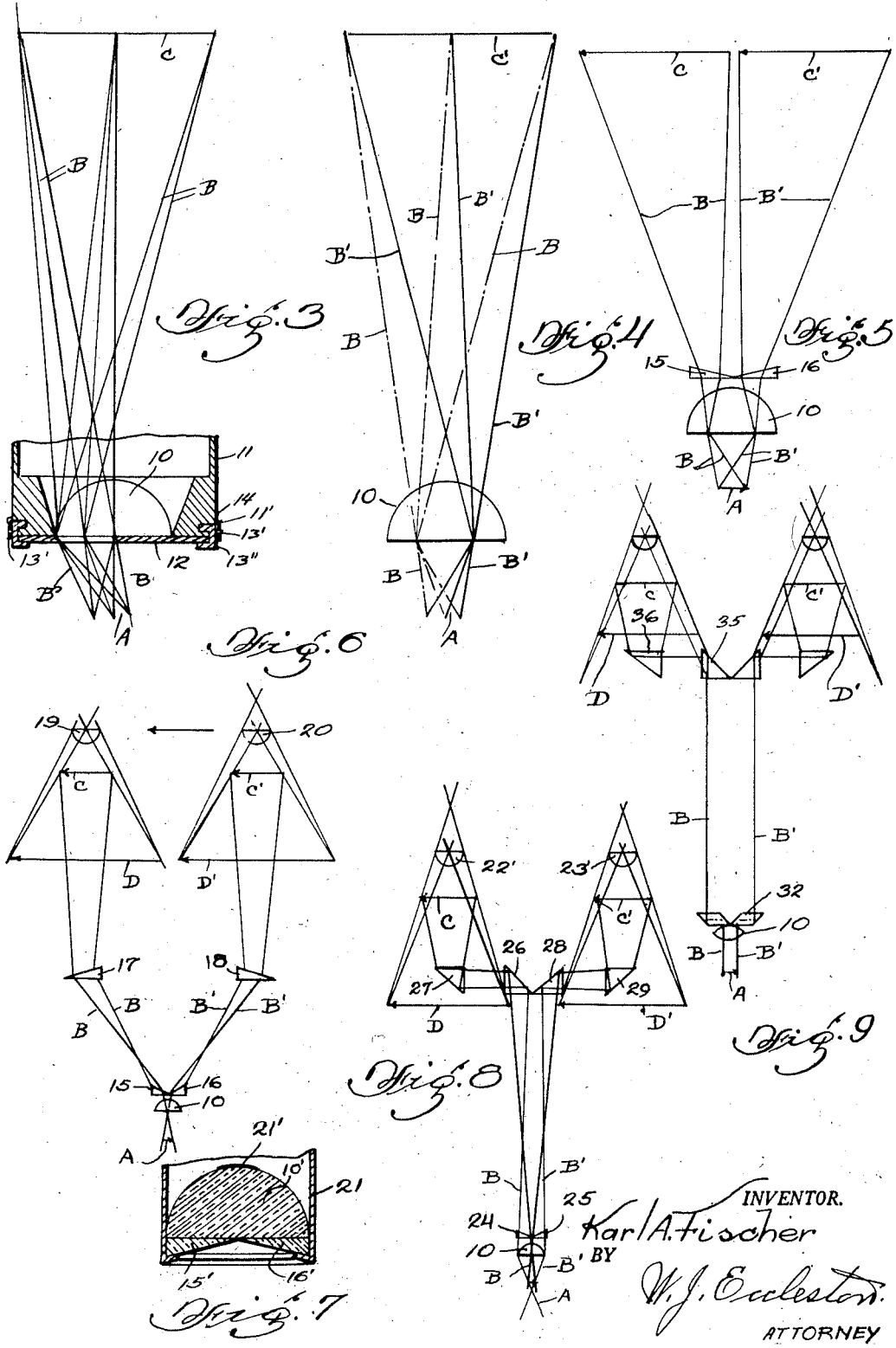

2,639,653

UNITED STATES PATENT OFFICE 2,639,653

MEANS FOR PRODUCING MICROPHOTO-
GRAPHS HAVING A THREE-DIMEN-
SIONAL EFFECT

Karl A. Fischer, Washington, D. C.

Application April 13, 1949, Serial No. 87,322

4 Claims. (Cl. 95—18)

(Granted under Title 35, U. S. Code (1952),
sec. 266)

The invention described herein, if patented, may be manufactured and used by or for the Government for governmental purposes, without the payment to me of any royalty thereon.

This invention relates to improved microscopes, and more particularly to means for producing microphotographs having a three-dimensional effect.

In microscopic research work, particularly, it is desirable and often times necessary to obtain three - dimensionally appearing microphotographs of an object or objects in space. According to well-known physical principles, such images can be obtained in their true relationship by viewing the object under different angles to produce two different images which may be superimposed by the eyes with a stereoscopic instrument or by a suitable binocular microscope to obtain a true vision of the object or objects in their three dimensions.

Various attempts have been made to modify microscopes in attempts to obtain stereoscopic impressions. In the main, these modifications have resulted in expensive microscope arrangements, at times producing nearly stereoscopic images. For example, many stereoscopic microscopes in present day usage are developments of the Greenough principle as originally made in the relative early stages of stereoscopic microscopes. The Greenough principle utilizes two objective lenses arranged in an acute angle to each other and simultaneously focused upon an object to produce two virtual images, from the two slightly different actual images of the objective lenses, which the eyes superimpose to produce a representation of the object in space. Basically, a stereoscopic microscope of this character is therefore a twin unit in which two complete microscopes are focused upon the object from two different angles. Such microscopes cannot be easily designed with objective lens for magnification higher than substantially 6 to 10 diameters; as the decreased focal length upon which increased magnifying power depends limits available construction space. More than 50 to 100 diameters total magnification is therefore rarely used with this type of instrument.

Further, stereoscopic microscopes, illustrated for example, in 1869 by Samuel Holmes in British Patent No. 1,882, cut an objective lens and arranged the halves in a pair of binocular type microscopes with suitable lenses to obtain two images in a stereoscopic relationship. This arrangement is a two lens system comparable to the Greenough type. In addition, numerous devices, for example of the Lihotzky type and others, have been developed with lens, prismatic and diaphragm arrangements for reproducing stereoscopic effects. In all such arrangements, the actual image is split outside the focus of the objective lens so that prisms which are positioned slightly out of alignment with each other produce images which give a depth impression but not always true reproduction of the original space arrangement of the object.

It is therefore an object of this invention to provide for an improvement in miscroscopes whereby a single objective lens will produce a three - dimensionally appearing microphotographic reproduction of the original space arrangement of an object.

It is another object of this invention to provide a simply constructed rotatable diaphragm attachment for a mono-tubular microscope, for the purpose of adapting the microscope to the production of three-dimensionally-appearing microphotographs.

Additional objects, advantages, modifications and adaptations will appear in the accompanying specification and the appended drawings, wherein:

Fig. 1 is a diagrammatic vertical view of a microscope with diaphragm attachment and microphotographic camera, in cross section, in accordance with this invention;

Fig. 2 is a modification of the microscope shown in Fig. 1;

Fig. 3 is a diagrammatic illustration of light rays passing through the objective lens of a monocular microscope equipped with a diaphragm attachment, as shown in Figure 1.

Fig. 4 is a diagrammatic embodiment of light rays projected through the objective lens through a conventional mono-tubular microscope of the type shown in Figure 1, but not equipped with a diaphragm attachment in accordance with the present invention.

Figs. 5 and 6 are diagrammatic illustrations of two arrangements of an objective lens and projected light rays in a binocular microscope embodied in this invention;

Fig. 7 is an illustrative modification of an objective lens and attachments embodied in this invention; and Figs. 8 and 9 are modifications of Fig. 6.

With reference to the drawings, a monocular microscope is illustrated in Fig. 1, as consisting of chief objective lens 10 contained in a conventional adjustable monocular tube 11, ocular lens 12′, and with or without correcting lens 39 and field lens 40. Attached to the lower end of tube 11 is a light blocking diaphragm 12 closely adjacent to objective lens 10, supported by attachment mounting 13 in sliding engagement with bead 11" and provided with stop pins 13' for contact with abuttments 11' upon 180° rotation. The blocking diaphragm 12 alternately causes each lens half to produce different images in the manner as hereinafter illustrated. A modified holder for diaphragm 12 is illustrated in Fig. 3 as supported by a slideable ring holder 13", mounted in a holding groove 14 in tube 11 and provided with projecting pins 13' adapted to contact stop pin 11' upon 180° rotation. Obviously, this diaphragm 12 may be mounted in a holder adapted to be slipped into or onto a mircorscope tube end before or after the objective lens 10 and within its focal point, both the microscope tube and attachment being provided with stops, adjustments, markings or indicating means which permits turning of the attachment to alternately cover or block exactly one-half or a portion of the light transmitted to the objective lens 10. Such holding collars or mounting may be sufficiently flexible character and the lens holding tube provided with an expanding bead or other temporary holding means, as desired. As there are no advantages obtained by viewing such images successively with only one eye, the primary purpose of producing true stereoscopic images in the monocular type of microscope is to provide a structure which may be utilized with a microphotographic camera in the production of microphotographs which may be viewed through a stereoscope to reproduce an enlarged three-dimensionally appearing view of the object. Alternate blocking of each lens half with the diaphragm 12 will produce two slightly dissimilar images of an object with the space impression provided by image rays passing through the complementary halves of the objective lens or lens assembly 10.

It is an established physical fact that every single point of the objective lens transmits a picture of every single point of an object positioned under the microscope lens. Accordingly, the half-open portion of lens 10 views every point of the object A at an angle and not centrally through the projected light rays B, illustrated at three points on A, which are projected through lens 10 to produce an inverted image C. After a photograph of the image C is taken through the ocular lens of the microscope with a conventional photographic camera P, e. g. of the type shown in U. S. Patent No. 1,537,539, the opaque semicircular light blocking diaphragm 12 is adjusted to cover the opposite half of the lens 10. Again the lens 10 produces image C' of the object A from an angle, through light rays B', which is in the opposite direction to the first angular view, above described. Again, a photograph is taken through the ocular lens of the microscope with conventional apparatus. Thereafter, the two exposures, which are not identical, are properly finished and mounted side-by-side for examination in a stereoscope, and the eyes superimpose the pictures to give a three-dimensional impression.

In Figs. 5 and 7, there are disclosed means whereby the described principle of dividing the light can be applied to produce true stereoscopic vision without blocking one-half the objective lens as shown in Figs. 3 and 4. In this instance, a pair of wedge-shaped prisms 15 and 16 of proper thickness are arranged immediately before, or after the objective lens or lens assembly 10 and within their focal point distance. As figuratively illustrated, the wedges 15' and 16' may be mounted in an attaching holding ring 21 similar to the light blocking diaphragm mountings heretofore described. Likewise, light reflecting prisms may be mounted for insertion into or onto the objective lens assembly. These wedges 15 and 16 or 15' and 16' are positioned to intercept the light rays B and B' projecting from object A through the left and right halves of lens 10, to reproduce two different images C and C', respectively, upon two different areas which lie in the same plane. The angular deflection of such an arrangement will result in a more or less pronounced distortion of the image, particularly when viewed through a monocular microscope, and it will therefore be apparent that this arrangement is only suitable for a binocular type microscope of the type shown in Fig. 2.

As illustrated in Fig. 6, any distortion which may be caused by angular deflection in the arrangement shown in Fig. 5, is corrected by properly positioning a pair of suitable wedge prisms 17 and 18 in a reverse order to the wedges 15 and 16 respectively, between the latter and the eyepieces 19 and 20. In this view, the image rays of B and B' of the object A, are passed through the left and right sides of objective lens or lens assembly 10 and retained as left and right side views by wedge prisms 15 and 16, respectively. From wedges 15 and 16 the image rays B and B' pass through the wedges 17 and 18 to reproduce actual images C and C', respectively. The two eyepieces, as represented by 19 and 20 reproduce the actual images C and C' as virtual images D and D', respectively, in true stereoscopic relationship from the single objective lens 10. It is obvious that to obtain a true stereoscopic vision, the two eyepieces are indispensable and such eyepieces as may be found in conventional binocular microscopes utilizing one objective lens system whose focal length may be varied within any desirable limits and may be modified to include such systems as herein disclosed. It is furthermore evident from the illustrations that the angle under which the object is viewed by the single objective lens depends upon the focal length of the lens. For example, a low power lens with large focal length means a more acute angle. But even for very weak objective lenses or lens systems, this angle has been discovered to be large enough to produce an immaculate stereoscopic image. For a high power lens and short focal distance, especially for large numeric aperture lenses the conditions are much more favorable, as in this case, the angles under which the objective lens views the object, in the manner as herein described, are considerably larger and less acute. Therefore, the stereoscopic impression is still more pronounced. Such impressions are of great importance when the objects are of minute dimensions, as when bacteria, microcrystals or similar objects are examined with high power lenses such as used in an immersion system. These objects are often very flat and a large angle of observation from both sides emphasizes the space impression.

As illustrated in Figure 7, the objective lens 10' of a simplified binocular microscope may be provided with a central narrow covering strip 21 which is impermeable to light. This impermeable strip 21 may be attached or impressed either on the top or bottom of the lens 10 or on both sides, as desired. In any case, such nonlight transmitting area provided on or in the objective lens 10 will increase the angle of vision because the mean angle under which each lens side views the object becomes larger. It is evident, however, that this modification will decrease the total light throughput through the microscope.

In Figure 8 there is disclosed a binocular microscope arrangement shown inserted in Fig. 2 and comprising a single objective lens 10 mounted in tube 11 which produces true stereoscopic images for the oculars 22 and 23. In this arrangement, the image light rays B and B' from object A pass through the left and right sides of lens 10 and are projected into the left and right side eyepieces 22 and 23, by properly dimensioned wedge prisms 24 and 25 and conventional prisms 26, 27, and 28, 29, to produce actual images C and C' which are reproduced as virtual images D and D', by ocular lens 22' and 23' respectively. The wedge prisms 24 and 25 are mounted in a holding ring 25', with their thin ends meeting at the center over lens 10, deflecting the two sets of light beams B and B', which are produced by the left and right sides of lens 10, respectively. Thereafter, as illustrated, the prism and lens arrangement of a suitable type binocular microscope will project two different images into the eyes which then superimpose them in the brain to give true stereoscopic vision.

As illustrated in Figure 9, a binocular microscope magnifying system utilizing a single objective lens 30 divides the image rays B and B', of object A, by means of doubly reflecting prisms 31 and 32. These image rays B and B' are projected through the eyepieces 33 and 34 by means of conventional prisms 35, 36 and 37, 38 as different virtual images D and D' of actual images C and C' in the manner as described in connection with Figure 8.

It will be apparent from the preceding examples that the light blocking diaphragm, light beam splitting wedge prisms or light beam splitting reflecting prisms must be positioned within the focal point distance of the chief objective lens. In some instances, it may be advantageous to fasten the wedge prisms to the flat face of the objective lens. Especially for lower power lenses, it may be more desirable to insert the light dividing wedges, or the blocking diaphragms for photography, immediately after the objective lens. For high power non-immersion lenses, it may be preferable to grind the wedge prisms upon the face side of the system. For oil immersion systems it will be necessary to arrange the wedges or beam dividing prisms in the interior of the objective lens system, which may be immediately behind the tiny spherical front lens or below the correcting lens members of such systems. For medium and low power lenses, it is frequently desirable to position the blocking diaphragm, wedge prisms or light dividing means, of the character herein described behind the correcting lens members but within the focal point of the objective lens assembly.

In accordance with the patent statutes, I have described in detail what I now consider to be the preferred embodiment of this invention, but it will be obvious that various minor changes may be made in the structural details, without departing from the spirit of this disclosure, and it is intended that such changes be included within the scope of the invention as defined in the appended claims.

I claim:

1. In a system for taking microphotographs, said system including a microscope comprising an elongated cylindrical tube, ocular lens means mounted on one end of said tube and a microscope objective lens mounted at the opposite end of said tube, and a photographic camera disposed in operative relation with said ocular lens means: the combination with said system of a rotatable diaphragm assembly mounted on said elongated cylindrical tube closely adjacent said objective lens, said diaphragm assembly comprising an opaque semicircular disc closely adjacent to said objective lens and an annular rotatable mounting surrounding said semicircular disc, said annular mounting interfitting with said last-named end of said elongated cylindrical tube; whereby said semicircular disc may be rotated to alternately block and unblock complementary halves of the effective area of said objective lens for the successive taking of slightly dissimilar microphotographs by said camera through said objective lens, said microphotographs giving a three-dimensional effect when viewed in side-by-side assembly.

2. In a system for taking microphotographs, said system including a microscope comprising an elongated cylindrical tube, ocular lens means mounted on one end of said tube and a microscope objective lens mounted at the opposite end of said tube, and a photographic camera disposed in operative relation with said ocular lens means: the combination with said system of a rotatable diaphragm assembly mounted on said elongated cylindrical tube closely adjacent said objective lens, said diaphragm assembly comprising an opaque semicircular disc closely adjacent to said objective lens, an annular rotatable mounting surrounding said semicircular disc, said annular mounting interfitting with said last-named end of said elongated cylindrical tube, and a stop coacting with said diaphragm assembly for arresting its rotation after completion of a 180° arc; whereby said semicircular disc may be rotated to alternately block and unblock complementary halves of the effective area of said objective lens for the successive taking of slightly dissimilar microphotographs by said camera through said objective lens, said microphotographs giving a three-dimensional effect when viewed in side-by-side assembly.

3. In a system for taking microphotographs, said system including a microscope comprising an elongated cylindrical tube, ocular lens means mounted on one end of said tube and a microscope objective lens mounted at the opposite end of said tube, and a photographic camera disposed in operative relation with said ocular lens means: the combination with said system of a rotatable diaphragm assembly mounted on said elongated cylindrical tube closely adjacent said objective lens, said diaphragm assembly comprising an opaque semicircular disc closely adjacent to said objective lens and a resilient annular rotatable mounting surrounding said semicircular disc, said resilient annular mounting embracing said last-named end of said elongated cylindrical tube; whereby said semicircular disc may be rotated to alternately block and unblock complementary halves of the effective area of said objective lens for the successive taking of slightly dissimilar microphotographs by said camera through said objective lens, said microphotographs giving a three-dimensional effect when viewed in side-by-side assembly.

4. In a system for taking microphotographs, said system including a microscope comprising an elongated cylindrical tube, ocular lens means mounted on one end of said tube and a microscope objective lens mounted at the opposite end of said tube, and a photographic camera disposed in operative relation with said ocular lens means: the combination with said system of a rotatable diaphragm assembly mounted on said elongated cylindrical tube closely adjacent said objective lens, said diaphragm assembly comprising an opaque semicircular disc closely adjacent to said objective lens, a resilient annular rotatable mounting surrounding said semicircular disc, said resilient annular mounting embracing said last-named end of said elongated cylindrical tube, and a stop coacting with said diaphragm assembly for arresting its rotation after completion of a 180° arc; whereby said semicircular disc may be rotated to alternately block and unblock complementary halves of the effective area of said objective lens for the successive taking of slightly dissimilar microphotographs by said camera through said objective lens, said microphotographs giving a three-dimensional effect when viewed in side-by-side assembly.

KARL A. FISCHER.

References Cited in the file of this patent

UNITED STATES PATENTS

| Number | Name | Date |
|---|---|---|
| 230,320 | Molera et al. | July 20, 1880 |
| 1,056,588 | Rusk | Mar. 18, 1913 |
| 1,068,862 | Digweed | July 29, 1913 |
| 1,311,008 | Quick | July 22, 1919 |
| 1,605,016 | Trezise | Nov. 2, 1926 |
| 2,224,775 | Bartow | Dec. 10, 1940 |
| 2,351,753 | Flint | June 20, 1944 |

FOREIGN PATENTS

| Number | Country | Date |
|---|---|---|
| 2,118 | Great Britain | of 1895 |
| 762,687 | France | Jan. 29, 1934 |
| 147,586 | Austria | Nov. 10, 1936 |